US011067986B2

(12) United States Patent
Umetani et al.

(10) Patent No.: US 11,067,986 B2
(45) Date of Patent: Jul. 20, 2021

(54) AUTONOMOUS DRIVING VEHICLE, METHOD OF STOPPING AUTONOMOUS DRIVING VEHICLE, AND RECORDING MEDIUM

(71) Applicant: Panasonic Intellectual Property Corporation of America, Torrance, CA (US)

(72) Inventors: Hideo Umetani, Kanagawa (JP); Naoyuki Harada, Osaka (JP); Takuya Yamaguchi, Osaka (JP); Shuhei Matsui, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 220 days.

(21) Appl. No.: 16/299,847

(22) Filed: Mar. 12, 2019

(65) Prior Publication Data
US 2019/0212738 A1 Jul. 11, 2019

Related U.S. Application Data

(63) Continuation of application No. PCT/JP2017/044809, filed on Dec. 14, 2017.

(30) Foreign Application Priority Data

Apr. 14, 2017 (JP) .............................. JP2017-080590

(51) Int. Cl.
*G05D 1/00* (2006.01)
*G08G 1/00* (2006.01)
(Continued)

(52) U.S. Cl.
CPC ........... *G05D 1/0088* (2013.01); *B60Q 1/503* (2013.01); *B60W 30/00* (2013.01); *G05D 1/0016* (2013.01);
(Continued)

(58) Field of Classification Search
CPC .. G05D 1/0088; G05D 1/0016; G05D 1/0212; G05D 1/0231; G05D 1/0257;
(Continued)

(56) References Cited

U.S. PATENT DOCUMENTS

2016/0377448 A1* 12/2016 Burns ................ G01C 21/3617
701/424
2017/0080900 A1* 3/2017 Huennekens ........ G05D 1/0088
(Continued)

FOREIGN PATENT DOCUMENTS

EP 2982562 A1 2/2016
JP 2015-133050 7/2015
(Continued)

OTHER PUBLICATIONS

Translation of (JP 2015191641 A) Monitoring Equipment, Monitoring System, Monitoring Method, and Program (Year: 2015).*
(Continued)

*Primary Examiner* — James J Lee
*Assistant Examiner* — Alexander George Matta
(74) *Attorney, Agent, or Firm* — Greenblum & Bernstein, P.L.C.

(57) ABSTRACT

An autonomous driving vehicle includes a main vehicle part, a processor, and a memory storing thereon a computer program, which when executed by the processor, causes the processor to perform operations. The operations include detecting a gesture made, to try to stop the main vehicle part, by a person present near a road on which the main vehicle part is running, determining whether there is a passenger in the main vehicle part, and controlling autonomous driving of the main vehicle part. In a case where it is determined that there is no passenger in the main vehicle part, when a person making the gesture is detected, the controlling controls the main vehicle part to stop near the person.

16 Claims, 5 Drawing Sheets

(51) Int. Cl.
  *G05D 1/02* (2020.01)
  *B60Q 1/50* (2006.01)
  *B60W 30/00* (2006.01)
  *G06Q 50/30* (2012.01)
  *G06Q 10/02* (2012.01)

(52) U.S. Cl.
  CPC ........... *G05D 1/0212* (2013.01); *G06Q 10/02* (2013.01); *G06Q 50/30* (2013.01); *G08G 1/202* (2013.01); *G05D 1/027* (2013.01); *G05D 1/0231* (2013.01); *G05D 1/0257* (2013.01); *G05D 1/0278* (2013.01); *G05D 2201/0213* (2013.01)

(58) Field of Classification Search
  CPC ................. G05D 1/027; G05D 1/0278; G05D 2201/0213; B60Q 1/503; B60W 30/00; G06Q 10/02; G06Q 50/30; G08G 1/202
  See application file for complete search history.

(56) References Cited

U.S. PATENT DOCUMENTS

| | | | |
|---|---|---|---|
| 2018/0025234 A1* | 1/2018 | Myers | G05D 1/0088 348/148 |
| 2018/0052519 A1* | 2/2018 | Amores-Llopis | G06F 3/011 |
| 2019/0263422 A1* | 8/2019 | Enthaler | G06K 9/00355 |

FOREIGN PATENT DOCUMENTS

| | | | |
|---|---|---|---|
| JP | 2015-191264 | 11/2015 | |
| JP | 2015-191641 | 11/2015 | |
| JP | 2015191641 A * | 11/2015 | |
| WO | WO-2017155740 A1 * | 9/2017 | G06K 9/00355 |
| WO | 2018/050729 A1 | 3/2018 | |

OTHER PUBLICATIONS

International Search Report of PCT application No. PCT/JP2017/044809 dated Mar. 13, 2018.
The Extended European Search Report from the European Patent Office (EPO) dated Apr. 17, 2020 for the related European Patent Application No. 17905521.5.

* cited by examiner

AUTONOMOUS DRIVING VEHICLE, METHOD OF STOPPING AUTONOMOUS DRIVING VEHICLE, AND RECORDING MEDIUM

BACKGROUND

1. Technical Field

The present disclosure relates to an autonomous driving vehicle, a method of stopping an autonomous driving vehicle, and a recording medium.

2. Description of the Related Art

In recent years, an autonomous driving vehicle capable of autonomously driving without a driving operation by a driver has been developed (see, for example, Japanese Unexamined Patent Application Publication No. 2015-133050). Employing such an autonomous driving vehicle as a taxi has also been investigated.

SUMMARY

One non-limiting and exemplary embodiment provides a technique of allowing a potential passenger wanting to catch a taxi to efficiently get in an autonomous driving vehicle.

In one general aspect, the techniques disclosed here feature an autonomous driving vehicle including a main vehicle part, a processor, and a memory storing thereon a computer program, which when executed by the processor, causes the processor to perform operations including detecting a gesture made, to try to stop the main vehicle part, by a person present near a road on which the main vehicle part is running, determining whether there is a passenger in the main vehicle part, and controlling autonomous driving of the main vehicle part, wherein in a case where it is determined that there is no passenger in the main vehicle part, when a person making the gesture is detected, the controlling controls the main vehicle part to stop near the person.

According to the aspect, it is possible to allow a potential passenger wanting to catch a taxi to efficiently get in an autonomous driving vehicle.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
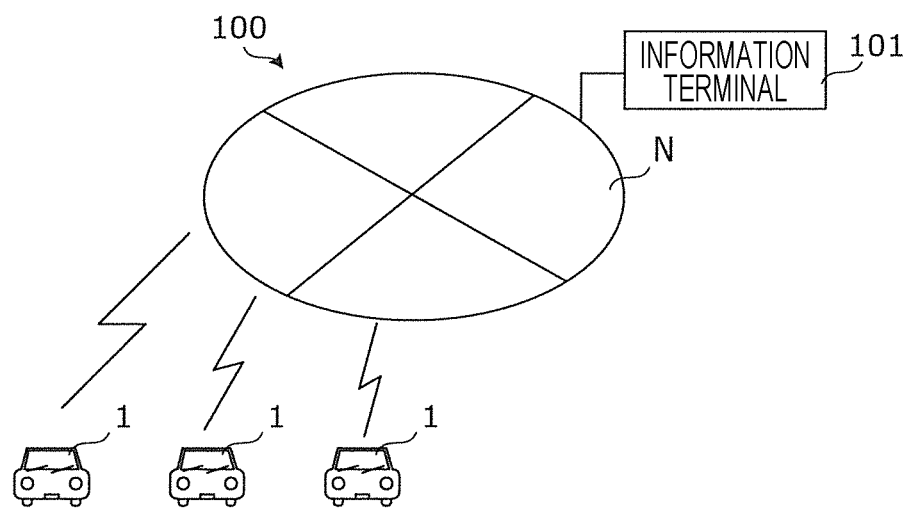
FIG. 1 is a schematic diagram roughly illustrating a configuration of a vehicle dispatch system according to an embodiment.

Underlying Knowledge Forming Basis of the Present Disclosure

The present inventor has investigated feasibility of employing an autonomous driving vehicle as a taxi. According to definitions by the Japanese government or the National Highway Traffic Safety Administration of the USA, a level-4 autonomous driving vehicle is supposed to be capable of driving fully autonomously, and thus a passenger is not supposed to be involved in any driving operation. That is, in a case where a level-4 autonomous driving vehicle is employed as a taxi, the autonomous driving vehicle itself needs to determine whether there is a potential passenger on a road, and if there is a potential passenger, the autonomous driving vehicle needs to stop near the potential passenger. However, if the autonomous driving vehicle stops each time a potential passenger is detected even in a state in which a passenger is already present in the autonomous driving vehicle, an inefficient situation occurs. In view of the above, the present disclosure provides a technique that can solve the problem described above.

An aspect of the present disclosure provides an autonomous driving vehicle including a main vehicle part, a processor, and a memory storing thereon a computer program, which when executed by the processor, causes the processor to perform operations including detecting a gesture made, to try to stop the main vehicle part, by a person present near a road on which the main vehicle part is running, determining whether there is a passenger in the main vehicle part, and controlling autonomous driving of the main vehicle part, wherein in a case where it is determined that there is no passenger in the main vehicle part, when a person making the gesture is detected, the controlling controls the main vehicle part to stop near the person.

An aspect of the present disclosure provides a method of stopping an autonomous driving vehicle, including stopping a main vehicle part of the autonomous driving vehicle such that in a case where it is determined that there is no passenger in the main vehicle part of the autonomous driving vehicle, when a gesture is detected which is made, to try to stop the main vehicle part, by a person present near a road on which the main vehicle part is running, the main vehicle part is stopped near the person who made the gesture.

An aspect of the present disclosure provides a non-transitory recording medium storing thereon a program, which when executed, causes a computer to execute the above-described method of stopping an autonomous driving vehicle.

Thus, in a case where it is determined that there is no passenger in the main vehicle part of the autonomous driving vehicle, when a gesture made to try to stop the main vehicle part is detected, the main vehicle part is stopped near the person who made the gesture. However, in a case where there is a passenger in the main vehicle part, the autonomous driving vehicle continues running without stopping. That is, it is possible to prevent the autonomous driving vehicle from stopping in order to try to get a potential passenger into the autonomous driving vehicle when there is already a passenger in the autonomous driving vehicle. This makes it possible to efficiently get a potential passenger in the autonomous driving vehicle.

The detecting the gesture may detect the gesture made by the person present on either one of a left-hand side or a right-hand side of the road.

This makes it possible to set, as a detection area, one of the right-hand side and the left-hand side of the road, and thus it is possible to achieve an increase in the speed of the detection process. For example, in countries in which vehicles are supposed to run on left-hand sides of roads, in many cases, potential passengers are present on left-hand sides of roads. Therefore, by setting the left-hand side of the road as the detection area of the gesture detector, it becomes possible to achieve an increase in speed of the detection process.

In the autonomous driving vehicle, the operations may further include detecting the number of lanes on the road in the same running direction, wherein in the detecting the gesture, in a case where it is detected that the number of lanes is 1, the detecting may detect the gesture made by the person present on the right-hand side and the left-hand side of the road, while in a case where it is detected that the number of lanes is 2 or greater, the detecting may detect the gesture made by the person present on one of the right-hand side and the left-hand side of the road.

This makes it possible to adjust the detection area in the detecting of the gesture depending on the number of lanes.

For example, in a case where the number of lanes in the same running direction is 1, the total width of the road is likely to be relatively small. More specifically, when a road is a one-way road or a road with one lane on each side, the number of lanes in the same running direction is detected as 1. When the road is a one-way road, the autonomous driving vehicle running on a lane of this road is allowed to deal with potential passengers present on the right-hand side and the left-hand side of the road. When the road is a road with one lane on each side, the autonomous driving vehicle is allowed to make a U-turn to deal with a potential passenger present on a side of an opposite lane.

On the other hand, in a case where the number of lanes in the same running direction is greater than or equal to 2, the total width of the road is relatively large. Therefore, it is not desirable for the autonomous driving vehicle to deal with both potential passengers present on the right-hand side and the left-hand side of the road, because, for example, moving to the other lane may interfere with running of another vehicle.

The capability of adjusting the detection area in the detecting of the gesture depending on the number of lanes as described above makes it possible to set the detection area properly depending on the situation.

In the autonomous driving vehicle, in the controlling, in a case where it is detected that the number of lanes is 2 or greater and further it is detected that there is no passenger in the main vehicle part, the controlling may control the main vehicle part to run on a lane located closest to a sidewalk of the two or more lanes.

In almost all cases, potential passengers are present on a sidewalk. Therefore, when it is determined that there is no passenger in the main vehicle part, the main vehicle part is running on a lane located closest to a sidewalk of two or more lanes, that is, the main vehicle part is running on a lane closest to locations of potential passengers. This makes is possible to smoothly access a potential passenger.

In the autonomous driving vehicle, the operations may further include detecting whether a U-turn on the road is prohibited, wherein in the detecting of the gesture, in a case where it is detected that the U-turn is prohibited on the road, the detecting may detect the gesture made by the person present on one of the left-hand side or the right-hand side of the road.

This makes it possible to adjust the detection area in the detecting of the gesture depending on whether the U-turn is prohibited. More specifically, when the U-turn is prohibited, the autonomous driving vehicle is not allowed to move to an opposite lane. That is, even when there is a potential passenger on a side of a lane opposite to the lance on which the autonomous driving vehicle is running, the autonomous driving vehicle is not allowed to deal with the potential passenger. In this case, the detection area of the gesture detector may be set to an area including only one of the right-hand side and the left-hand side of the road.

In the autonomous driving vehicle, the detecting of the gesture may detect a second gesture made by the person to try to cancel stopping the main vehicle part, and in the controlling, in a case where after a person making the gesture is detected, the detecting further detects the second gesture made by the person, the controlling may control the main vehicle part to continue running.

Thus, in the case where after the gesture detector detects a person making a gesture, the gesture detector further detects the second gesture made by the person, the running of the main vehicle part is continued. That is, the intention of the potential passenger is recognized, and the main vehicle part is controlled to run continuously.

In the autonomous driving vehicle, the operations may further include providing a notification toward the outside of the main vehicle part, wherein in the providing of the notification, in a case where it is determined that there is no passenger in the main vehicle part, when a person making the gesture is detected, the providing of the notification may provide a notification indicating that the person is detected.

By providing a notification by the notifier to indicate that a person making a gesture is detected, it becomes possible to inform the potential passenger that the gesture is caught by the autonomous driving vehicle.

In the autonomous driving vehicle, the operations may further include communicating with a vehicle dispatch system that patches another autonomous driving vehicle to a specified location wherein in the communicating, in a case where it is determined that there is a passenger in the main vehicle part, when a person making the gesture is detected, the communicating may output a vehicle dispatch request to request a vehicle to be dispatched to a location where the person is present.

Thus, in the case where the determiner determines that there is a passenger in the main vehicle part, that is, in a situation in which it is not allowed to accept a potential passenger, if the gesture detector detects a person making a gesture, the communication part outputs, to the vehicle dispatch system, a vehicle dispatch request for displaying a vehicle to a location of this person. In response, the vehicle dispatch system dispatches another autonomous driving vehicle to the potential passenger.

It should be noted that general or specific embodiments may be implemented as a system, a method, an integrated circuit, a computer program, a computer-readable storage such as a CD-ROM disk, or any selective combination of a system, a method, an integrated circuit, a computer program, and a storage medium.

The autonomous driving vehicle according to an embodiment of the present disclosure is described in further detail below with reference to drawings.

Note that any embodiment described below is provided to illustrate an example. In the following embodiments, values, shapes, materials, constituent elements, locations of elements, manners of connecting elements, steps, the order of steps, and the like are described by way of example but not limitation. Among constituent elements described in the following embodiments, those constituent elements that are not described in independent claims indicating highest-level concepts of the present disclosure are optional.

1. Configuration

FIG. 1 is a schematic diagram roughly illustrating a configuration of a vehicle dispatch system 100 according to the present embodiment. The vehicle dispatch system 100 is a system in which autonomous driving vehicles 1 used as taxis are dispatched to particular locations. More specifically, the vehicle dispatch system 100 includes an information terminal 101 such as a personal computer, a tablet terminal, or the like. This information terminal 101 is capable of communicating with each autonomous driving vehicle 1 via a network N. The information terminal 101 outputs a vehicle dispatch command to each autonomous driving vehicle 1 to dispatch it to a particular location. Each autonomous driving vehicle 1 autonomously runs toward the particular location according to the vehicle dispatch command. Note that the vehicle dispatch system 100 may include a vehicle that needs to be operated by a human driver. In this case, based on a vehicle dispatch command received by the vehicle, the human driver drives the vehicle toward the specified location.

Figure 2:
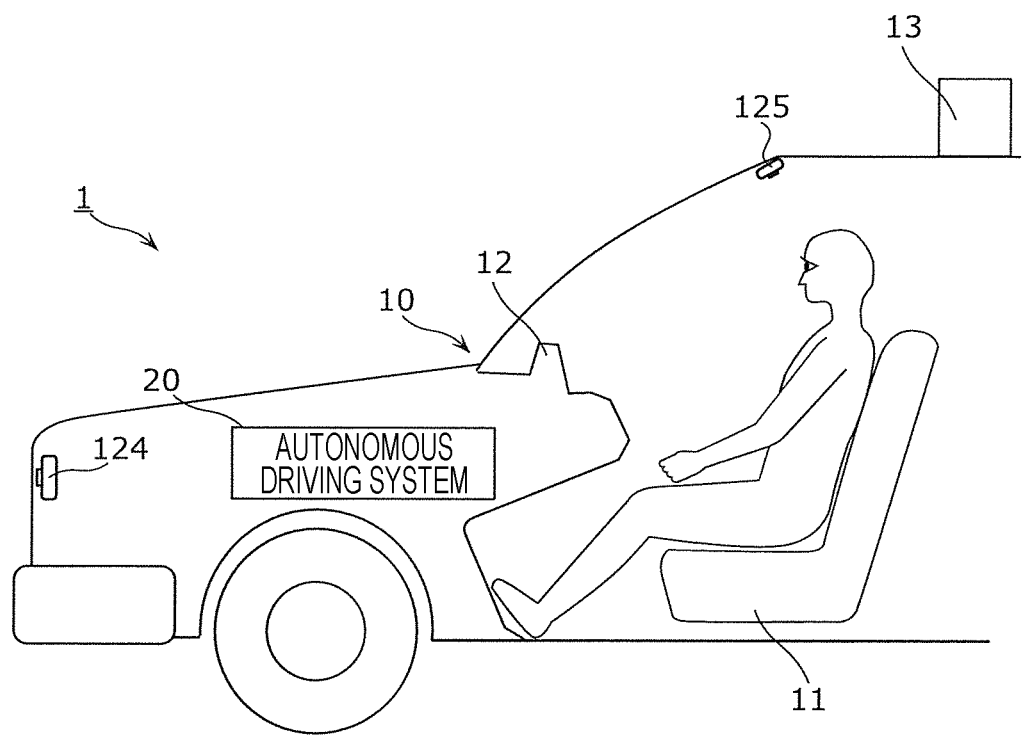
FIG. 2 is a schematic diagram illustrating an example of an autonomous driving vehicle according to an embodiment.

FIG. 2 is a schematic diagram illustrating an example of the autonomous driving vehicle 1 according to the present embodiment. As shown in FIG. 2, the autonomous driving vehicle 1 includes a main vehicle part 10, and an automatic driving system 20 for autonomously driving the main vehicle part 10. The automatic driving system 20 is installed in the main vehicle part 10. The main vehicle part 10 includes a sheet 11 for a passenger to sit on. An operation unit 12 to be operated by a passenger is installed on a dashboard located in front of the sheet 11. The operation unit 12 is, for example, a touch panel configured to be used by a passenger to specify a destination.

A notifier 13 for displaying various kind of information is disposed on a roof of the main vehicle part 10. Using this notifier 13, it is possible to notify people present outside the autonomous driving vehicle 1 of various kinds of information.

Figure 3:
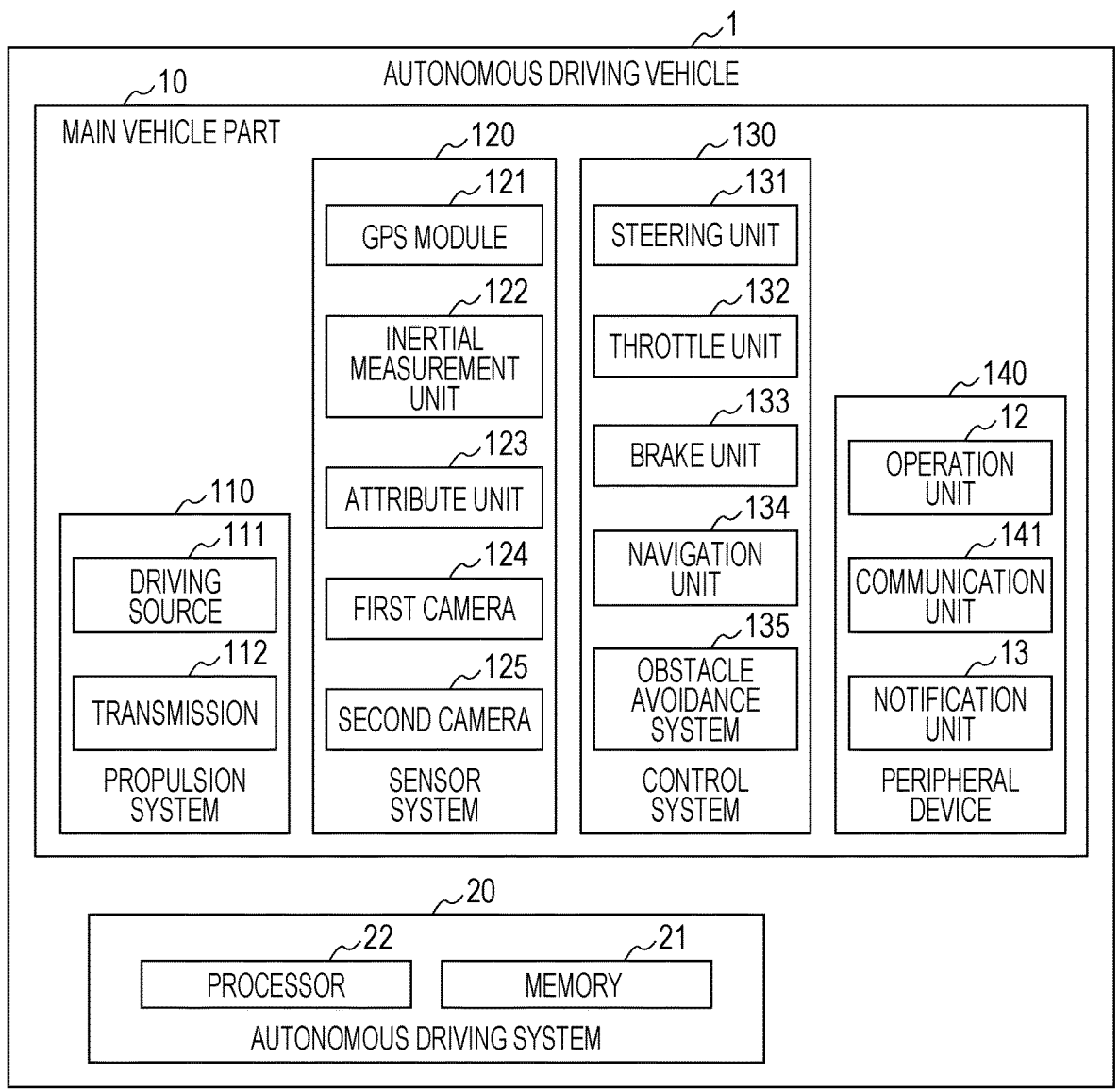
FIG. 3 is a block diagram illustrating an example of a functional configuration of an autonomous driving vehicle according to an embodiment.

FIG. 3 is a block diagram illustrating an example of a functional configuration of the autonomous driving vehicle 1 according to the present embodiment. As shown in FIG. 3, the main vehicle part 10 of the autonomous driving vehicle 1 includes a propulsion system 110, a sensor system 120, a control system 130, and peripheral devices 140.

The propulsion system 110 is a system that provides a power movement to the main vehicle part 10. More specifically, the propulsion system 110 includes a driving source 111 and a transmission 112.

The driving source 111 may be an internal-combustion engine, an electric motor, a steam engine, a Stirling engine, or the like. One of these may be used as a single apparatus or a combination thereof may be used as the driving source 111. For example, in a case where the autonomous driving vehicle 1 is a gas-electric hybrid vehicle, the driving source 111 is realized by a combination of a gasoline engine and an electric motor.

The transmission 112 is configured to transmit a mechanical power to wheels from the driving source 111. For example, the transmission 112 includes a gearbox, a clutch, a differential gear, a drive shaft, and/or other elements.

The sensor system 120 detects information regarding an environment in which the main vehicle part 10 is located. More specifically, the sensor system 120 includes several sensors to detect information regarding the environment. For example, the sensor system 120 includes a GPS module 121, an inertial measurement unit 122, an attribute unit 123, a first camera 124, and a second camera 125.

The GPS module 121 is a module that estimates latitude/longitude of the main vehicle part 10 via GPS (Global Positioning System). More specifically, the GPS module 121 estimates the position of the main vehicle part 10 with respect to the earth based on satellite-based positioning data. For example, the automatic driving system 20 estimates the position of a traffic lane line of a road on which the main vehicle part 10 is running by using the GPS module 121 together with map data.

The inertial measurement unit (IMU) 122 includes a set of sensors for detecting changes in the position and the direction of the main vehicle part 10 based on the inertia acceleration. The inertial measurement unit 122 may include, for example, an accelerometer and a gyroscope.

The attribute unit 123 determines attributes such as a distance, an altitude, a direction, or a velocity of an object located around the main vehicle part 10. More specifically, the attribute unit 123 includes a radar unit that determines a distance, an altitude, a direction, or a velocity of an object using a radio wave. The attribute unit 123 may include other systems similar to the radar. An example of such another system is a lidar system that detect, using light, an object existing in an environment in which the main vehicle part 10 is located. It is possible to capture a 3-dimensional (3D) image by using both scanning and non-scanning lidar systems together. A "3D gated viewing laser radar" is an example of a scanning laser ranging system using a pulsed laser and a high-speed gated camera.

The first camera 124 is an arbitrary camera (for example, a still camera, a video camera, etc.) adapted to capture an image of an environment in which the main vehicle part 10 is located. More specifically, the first camera 124 is installed in a front part of the main vehicle part 10 (see FIG. 2) such that the first camera 124 is allowed to capture an image of a scene ahead of the main vehicle part 10.

The second camera 125 is an arbitrary camera (for example, a still camera, a video camera, etc.) adapted to capture an image of the inside of the main vehicle part 10. More specifically, the second camera 125 is installed in the front part of the main vehicle part 10 (see FIG. 2) such that the second camera 125 is allowed to capture an image of the inside of the main vehicle part 10.

The control system 130 controls an operation of the main vehicle part 10 and operations of constituent elements of the main vehicle part 10. More specifically, the control system 130 may include a steering unit 131, a throttle unit 132, a brake unit 133, a navigation unit 134 and an obstacle avoidance system 135.

The steering unit 131 is a mechanism configured to adjust the orientation or the direction of the main vehicle part 10.

The throttle unit 132 is a mechanism configured to control the operation speed and the acceleration of the driving source 111 thereby controlling the speed and the acceleration of the main vehicle part 10.

The brake unit 133 is a mechanism configured to reduce the speed of the main vehicle part 10. For example, the brake unit 133 may reduce the speed of the wheels using friction. The brake unit 133 may be of a regeneration type, and kinetic energy of wheels may be converted into a current.

The navigation unit 134 is configured to determine a driving route for the main vehicle part 10. The navigation unit 134 may be configured to dynamically change the driving route during driving of the main vehicle part 10. In some examples, the navigation unit 134 may be configured to determine the driving route of the main vehicle part 10 by using the GPS module 121 together with one or more pieces of predetermined map data.

The obstacle avoidance system 135 identifies an obstacle existing in an environment in which the main vehicle part 10 is located, evaluates the obstacle, and gets through the obstacle by performing avoidance or other actions.

The control system 130 may have a sensor fusion algorithm, a computer vison system, and/or the like. The sensor fusion algorithm is, for example, an algorithm capable of being executed by a processor 22 in the automatic driving system 20. The sensor fusion algorithm is configured to receive, as an input, data from the sensor system 120. The sensor fusion algorithm provides various assessments based on data supplied from the sensor system 120, wherein the assessments include, for example, assessments of individual objects and/or features existing in an environment in which main vehicle part 10 is located, an assessment of a specific situation, and/or a collision that may occur in the specific situation.

The computer vision system is configured to process and analyze an image captured by the first camera 124 to identify objects and/or features in an environment in which the main vehicle part 10 is located, wherein the objects and/or features include, for example, lane information, a traffic signal, an obstacle, or the like. The computer vision system may use an object recognition algorithm, a structure from motion (SFM) algorithm, a video tracking, or other computer vision techniques.

The peripheral device 140 is configured to make it possible for the main vehicle part 10 to interact with an external device, another autonomous driving vehicle, and/or a passenger. More specifically, the peripheral device 140 includes, for example, an operation unit 12, a notifier 13, and a communication part 141.

The operation unit 12 is a system that functions such that when the operation unit 12 is operated by a passenger to input various instructions such as a command specifying a destination, the operation unit 12 accepts the various instructions. More specifically, the operation unit 12 is, for example, a touch panel. Alternatively, the operation unit 12 may be a voice input device.

The notifier 13 is an apparatus that provides information to people located outside the autonomous driving vehicle 1. More specifically, the notifier 13 includes an electronic bulletin board, a liquid crystal monitor, or the like and displays various kinds of information thereby providing visual information to people located outside the autonomous driving vehicle 1. Note that the notifier 13 may be an apparatus that provides various kind of information via a voice/sound.

The communication part 141 is a system capable of wirelessly communicating with other autonomous driving vehicles and the information terminal 101 via the network N. More specifically, the communication part 141 includes an antenna and a chipset for communicating with the network N. The chipset may be of a wireless communication type (for example, a protocol) capable of being generally implemented, and may be configured such that communication is possible according to one or more of standards including Bluetooth (registered trademark), a communication protocol described in IEEE802.11 (including all revised versions of IEEE802.11), a cellular technique (GSM (registered trademark), CDMA, UMTS, EV-DO, WiMAX, LTE, etc.), Zigbee, dedicated short range communication (DSRC), and radio frequency identification (RFID) communication.

The automatic driving system 20 is a controller that controls operations of respective constituent elements of the main vehicle part 10 thereby autonomously driving the main vehicle part 10. More specifically, the automatic driving system 20 includes a memory 21 and a processor 22.

The memory 21 may include one or more volatile storage components and/or nonvolatile storage components such as an optical, magnetic, and/or organic storages. The memory 21 may be fully or partially embedded in the processor 22. The memory 21 may include a program executable by the processor 22 to realize an autonomous driving function according to the present embodiment. The memory 21 also stores map data. The map data includes road map information, lane information indicating the number of lanes of a road, intersection information indicating a type of an intersection, speed limit information indicating a speed limit, and other information such as regulation information indicating a traffic regulation. The map data may be stored in advance in the memory 21. The map data may be updated such that each time latest map data is acquired from the network N via the communication part 141, the acquired map data is stored in the memory 21.

Furthermore, the memory 21 also stores reference gesture information used as a reference in identifying a gesture of hailing a taxi (a vehicle-stop-request gesture). The reference gesture information is data indicating a standard vehicle-stop-request gesture generally used in a country or an area to hail a taxi. This data includes position coordinates of respective feature points of the vehicle-stop-request gesture, an image of a characteristic pose of the vehicle-stop-request gesture, a moving image of the vehicle-stop-request gesture, and the like.

For example, in Japan, a gesture of "raising one hand", or "waving a raised hand" is a vehicle-stop-request gesture. Examples of vehicle-stop-request gestures used in other countries or areas include "opening a hand and waving it", "clasping a hand and raising it", "raising only a forefinger and a middle finger and shaking them", "raising only a middle finger and shaking it", "raising only a thumb", "clasping a hand such that a thumb protrudes between a forefinger and a middle finger", "beckoning", "pointing a forefinger to a vehicle", and the like. Other gestures may be used as vehicle-stop-request gestures. The reference gesture information may be stored such that after a country or an area to which the autonomous driving vehicle 1 is to be shipped is determined, reference gesture information customized to adapt to the determined country or area may be stored in the memory 21.

Furthermore, the memory 21 also stores second reference gesture information used as a reference in identifying a cancellation gesture (a second gesture). The second reference gesture information is data indicating a standard cancellation gesture that is used to cancel a gesture for stopping a taxy accepted by the autonomous driving vehicle 1. This data includes position coordinates of respective feature points of the cancellation gesture, an image of a characteristic pose of the cancellation gesture, a moving image of the cancellation gesture, and the like.

Any gesture different from the vehicle-stop-request gesture may be employed as the cancellation gesture. Examples of cancellation gestures include "crossing two arms", "shaking a head from side to side", "turning his/her back", "moving apart from a vehicle", and the like. In order to prevent a person displayed on a street advertisement from being recognized as an actual person, a motion which has no change for a predetermined period of time may also be regarded as a cancellation gesture.

The processor 22 may include one or more general-purpose processors and/or one or more dedicated processors (for example, an image processor, a digital signal processor, or the like). In a case where the processor 22 includes two or more processors, the two or more processors may operate independently or in cooperation.

The processor 22 reads out a program stored in the memory 21 and executes it thereby autonomously driving the main vehicle part 10. More specifically, based on various detection results input from the sensor system 120, various kinds of information input from the peripheral device 140, and various kinds of information stored in the memory 21, the processor 22 controls the propulsion system 110 and the control system 130 thereby autonomously driving the main vehicle part 10 to a destination while following traffic rules and avoiding other objects (such as other vehicles, buildings, persons, animals, etc.). The autonomous driving by the processor 22 may be controlled according to a known autonomous driving control method.

In the autonomous driving of the autonomous driving vehicle 1, the processor 22 also executes a method of stopping the autonomous driving vehicle 1.

2. Method of Stopping Autonomous Driving Vehicle

Figure 4:
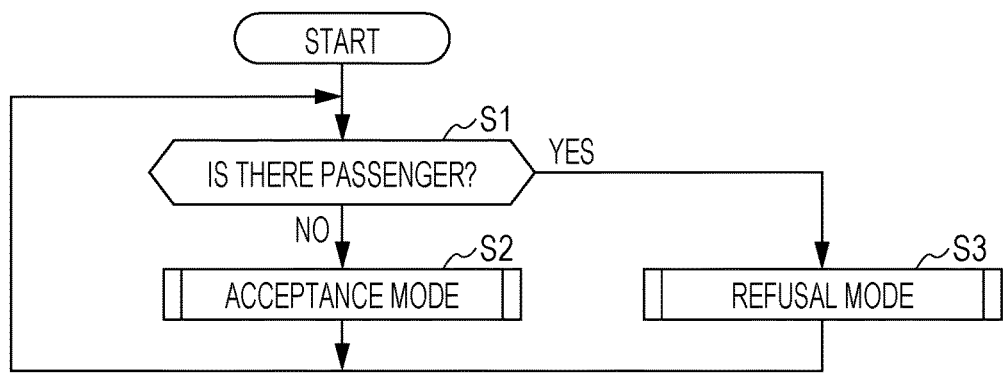
FIG. 4 is a flow chart illustrating a flow of a method of stopping an autonomous driving vehicle.
Figure 5:
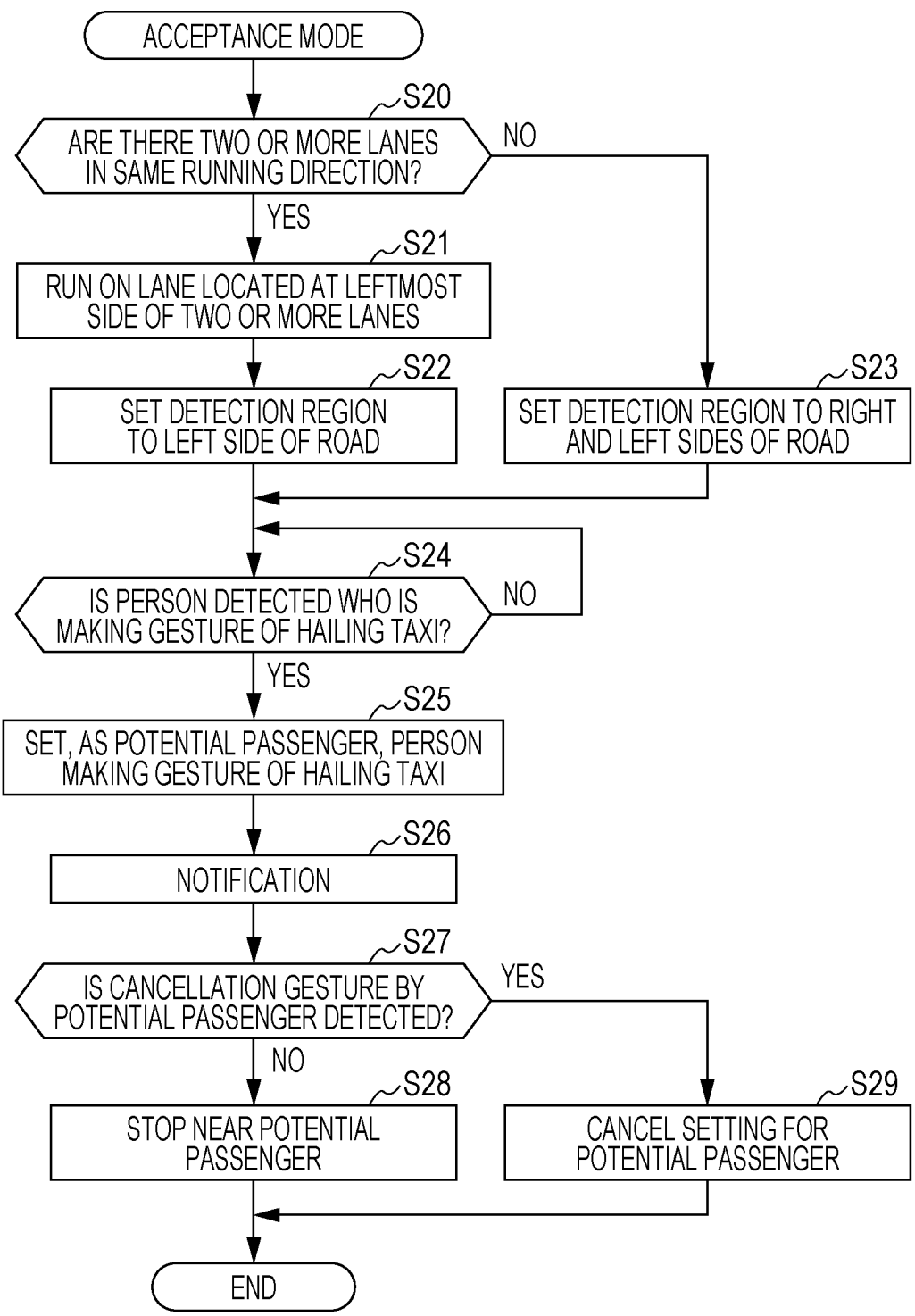
FIG. 5 is a flow chart illustrating an acceptance mode according to an embodiment.
Figure 6:
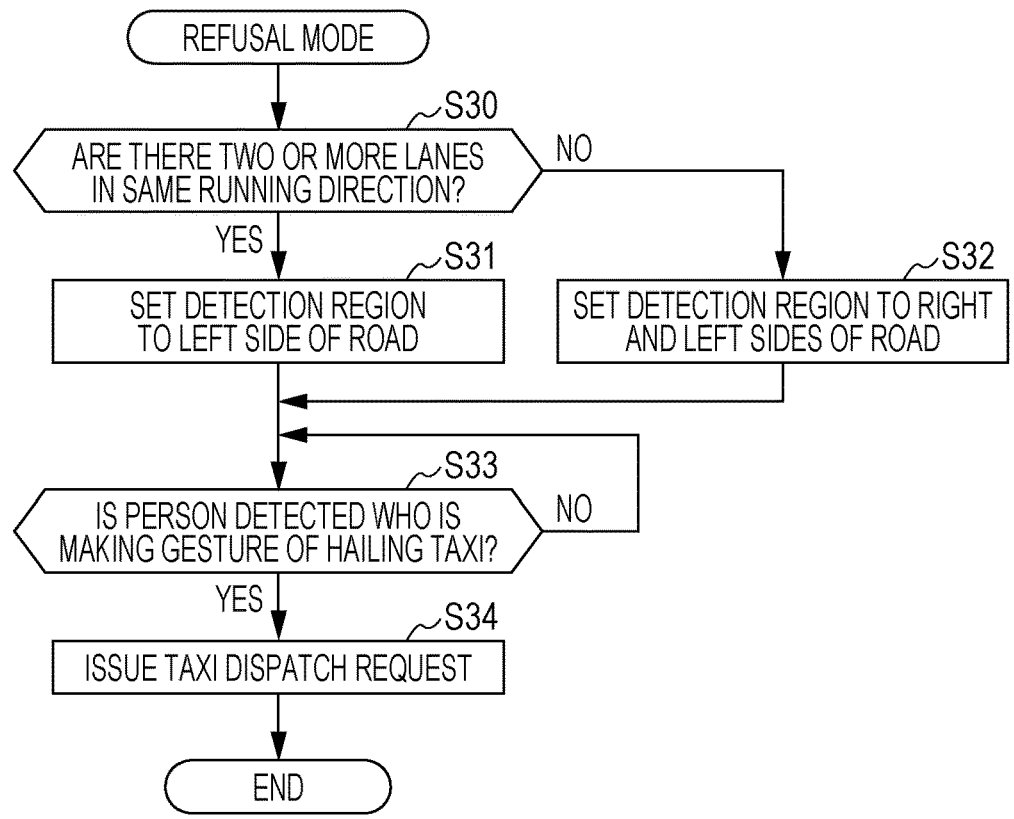
FIG. 6 is a flow chart illustrating a refusal mode according to an embodiment.

Next, the method of stopping the autonomous driving vehicle 1 executed by the automatic driving system 20 is described below. FIG. 4, FIG. 5, and FIG. 6 are flow charts illustrating a flow of the method of stopping the autonomous driving vehicle 1. In the following description, it is assumed by way of example that the autonomous driving vehicle 1 is used in Japan. That is, it is assumed that vehicles are supposed to run on the left-hand side of each road and "raising a hand" is used as the vehicle-stop-request gesture.

As shown in FIG. 4, in step S1, the processor 22 of the automatic driving system 20 determines whether a passenger is present in the main vehicle part 10 in the course of the autonomous driving. More specifically, based on an image of the inside of the main vehicle part 10 captured by the second camera 125, the processor 22 determines whether a passenger is present in the main vehicle part 10. That is, the processor 22 and the second camera 125 together function as a determiner that determines whether a passenger is present in the main vehicle part 10. In a case where the processor 22 determines that no passenger is present in the main vehicle part 10 (NO in step S1), the processor 22 proceeds to a step S2 thereby entering an acceptance mode, while in a case where it is determined that a passenger is present in the main vehicle part 10 (YES in step S1), the processor 22 proceeds to a step S3 thereby entering a refusal mode.

FIG. 5 is a flow chart illustrating a flow of the acceptance mode according to an embodiment. The acceptance mode is a mode in which the main vehicle part 10 is available to accept a passenger into the inside thereof.

In step S20 in the acceptance mode, the processor 22 determines whether there are two or more lanes in a direction in which the autonomous driving vehicle 1 is currently running. More specifically, the processor 22 detects the number of lanes from an image captured by the first camera 124 in the forward direction from the main vehicle part 10. That is, the processor 22 and the first camera 124 together function as a lane detector that detects the number of lanes on a road in the running direction. Alternatively, the processor 22 may detect the number of lanes based on map data and ae current position detected by the GPS module 121.

In a case where the processor 22 determines that the number of lanes is greater than or equal to 2 (YES in step S20), the process proceeds to step S21. In step S21, the processor 22 controls the main vehicle part 10 to run on a lane located closest to a sidewalk of the two or more lanes. Note that the sidewalk refers to an area which is adjacent to a roadway and in which a pedestrian may be present. The sidewalk may include a side strip, a shoulder, or the like. Running on such a lane makes it possible for the main vehicle part 10 to easily stop when a potential passenger G (see, for example, FIG. 7) is found.

Figure 7:
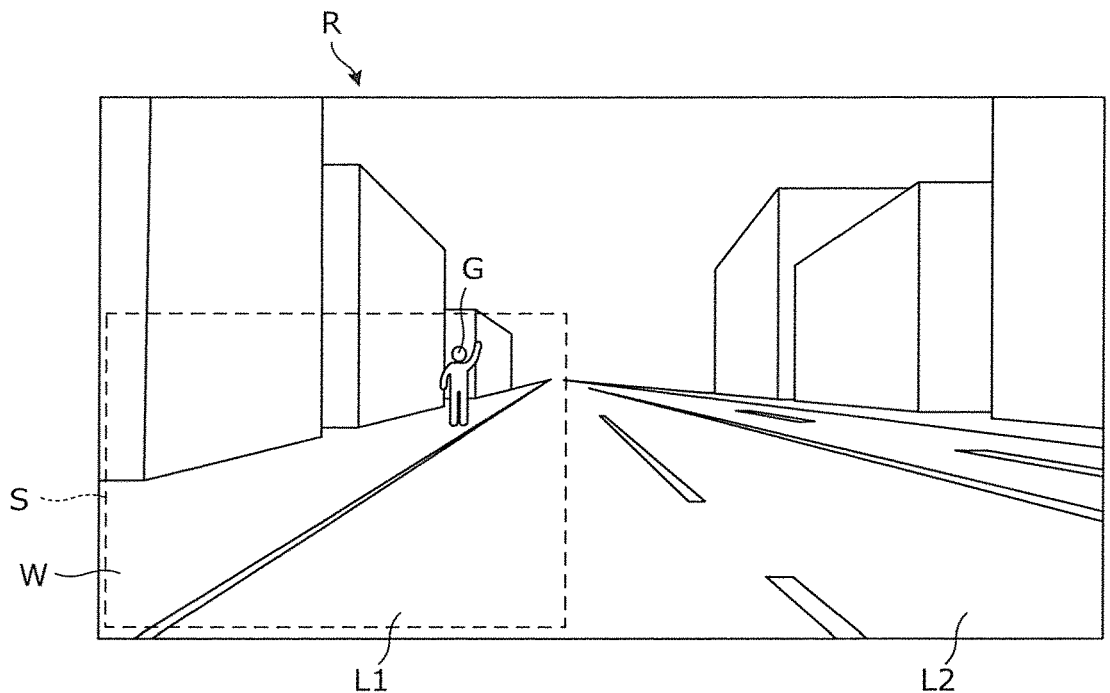
FIG. 7 is a schematic diagram illustrating an example of a captured image captured by a first camera in a situation in which an autonomous driving vehicle is running according to an embodiment.

FIG. 7 is a schematic diagram illustrating an example of a captured image captured by the first camera 124 in a situation in which the autonomous driving vehicle 1 is running according to an embodiment. In the example shown in FIG. 7, the number of lanes in the running direction is, by way of example, two. As shown in FIG. 7, the autonomous driving vehicle 1 is running on a lane L1, which is closest, of two lanes L1 and L2, to a sidewalk W, that is, the autonomous driving vehicle 1 is running on a leftmost side lane L1.

In step S22, the processor 22 sets a detection area S in which a gesture is to be detected such that an area including a left-hand side of a road is selected from an image capture area R of the first camera 124 and the selected area is set as the detection area S. More specifically, as shown in FIG. 7, the processor 22 selects, as the detection area S, an area which does not include the right-side lane L2 and includes at least the sidewalk W located on the left side of the lane L1. This makes it possible to detect a vehicle-stop-request gesture made by a person present on the left side of the road.

On the other hand, in a case where the processor 22 determines that the number of lanes is neither greater than nor equal to 2 (NO in step S20), the processor 22 proceeds to step S23.

Figure 8:
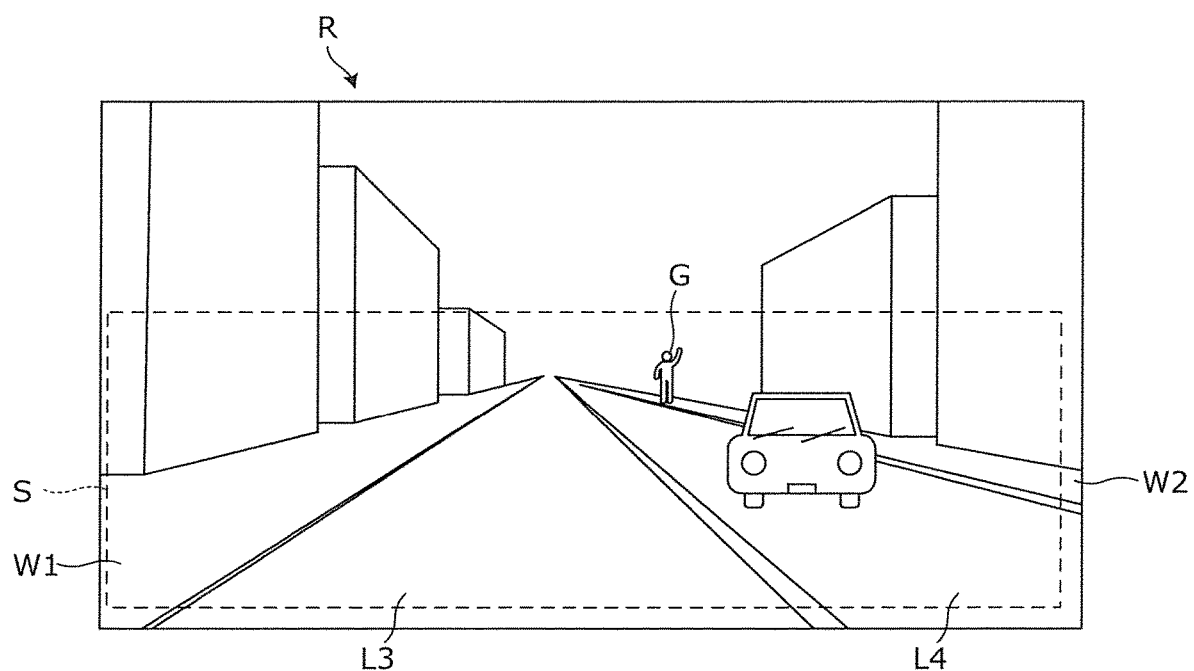
FIG. 8 is a schematic diagram illustrating an example of a captured image captured by a first camera in a situation in which an autonomous driving vehicle is running according to an embodiment.

FIG. 8 is a schematic diagram illustrating an example of a captured image captured by the first camera 124 in a situation in which the autonomous driving vehicle 1 is running according to an embodiment. In this example shown in FIG. 8, the number of lanes in the running direction is, by way of example, one. More specifically, in FIG. 8, the autonomous driving vehicle 1 is running on a road with one lane on each side.

In step S23, the processor 22 sets the detection area S such that an area including a left-hand side and a right-hand side of the road is selected from an image capture area R of the first camera 124 and the selected area is set as the detection area S. More specifically, the processor 22 sets, as the detection area S, an area including at least a left-hand side sidewalk W1 and a right-hand side road W2 of a road as shown in FIG. 8. This makes it possible to detect a vehicle-stop-request gesture made by a person present either on the left-hand side or on the right-hand side of the road.

In step S24, the processor 22 determines whether a person who is making a vehicle-stop-request gesture is detected within the detection area S. More specifically, the processor 22 checks a motion of a person present in the detection area S with the reference gesture information stored in the memory 21 thereby detecting a person making the vehicle-stop-request gesture. That is, the first camera 124, the memory 21 and the processor 22 together function as a gesture detector that detects the vehicle-stop-request gesture. In this checking, any checking method may be employed as long as it is capable of determining whether a motion of a person whose image is captured by the first camera 124 is a vehicle-stop-request gesture. For example, pattern matching may be employed as a checking method. When the processor 22 detects a person who is making a vehicle-stop-request gesture (YES in step S24), the processor 22 proceeds to step S25, while in a case where no person who is making a gesture for stopping a vehicle is detected (NO in step S24), the present state is maintained.

If it is determined that a person making a vehicle-stop-request gesture is detected, then, in step S25, the processor 22 regards the person as a potential passenger G and tracks this person within the image captured by the first camera 124. In the tracking, the position of the first camera 124 may be controlled such that the potential passenger G is always within the image capture area.

In step S26 the processor 22 controls the notifier 13 to provide a notification indicating that the potential passenger G is detected. As a result, the potential passenger G is notified that the autonomous driving vehicle 1 has caught the vehicle-stop-request gesture.

In step S27, the processor 22 checks a motion of the potential passenger G being tracked within the captured image with respect to the second reference gesture information stored in the memory 21 thereby determining whether a cancellation gesture made by the potential passenger G is detected. In this checking, any checking method may be employed as long as it is capable of determining whether a motion of a potential passenger G whose image is captured by the first camera 124 is a cancellation gesture. For example, pattern matching may be employed as a checking method. In a case where no cancellation gesture made by the potential passenger G is detected (NO in step S27), the processor 22 proceeds to step S28, while in a case where a cancellation gesture made by the potential passenger G is detected (YES in step S27), the processor 22 proceeds to step S29.

In step S28, the processor 22 controls the operation of constituent elements of the main vehicle part 10 such that the main vehicle part 10 autonomously drives until the main vehicle part 10 stops near the potential passenger G. As a result, it becomes possible for the potential passenger G to get in the autonomous driving vehicle 1. After the potential passenger G gets into the autonomous driving vehicle 1, the processor 22 terminates the acceptance mode and controls the main vehicle part 10 to again start autonomous driving.

Note that in a case where a potential passenger G is present on a sidewalk W2 opposite to a lane L3 on which the autonomous driving vehicle 1 as shown in FIG. 8, the processor 22 controls the main vehicle part 10 to make a U-turn and move to an opposite lane L4, the processor 22 then controls the main vehicle part 10 to stop near the potential passenger G.

In step S29, the processor 22 invalidates the assumption that the person is regarded as the potential passenger G, terminates the acceptance mode, and controls the main vehicle part 10 to again start autonomous driving.

In the present embodiment described above, an explanation has been given, by way of example, for the case where after the autonomous driving vehicle 1 provides the notification, the autonomous driving vehicle 1 stops near the potential passenger G. However, the timing of providing the notification is not limited to the example described above. For example, after the autonomous driving vehicle 1 stops near the potential passenger G, the notification may be provided.

In the present embodiment described above, an explanation has also been given, by way of example, for the case where after the autonomous driving vehicle 1 determines whether a cancellation gesture is made, the autonomous driving vehicle 1 stops near the potential passenger G. However, the timing of determining whether a cancellation gesture is made is not limited to the example described above. For example, after the autonomous driving vehicle 1 stops near the potential passenger G, the autonomous driving vehicle 1 may determine whether a cancellation gesture is made.

FIG. 6 is a flow chart illustrating a flow of a refusal mode according to an embodiment. The refusal mode is a mode in which accepting a potential passenger G is refused when a passenger is already present in the main vehicle part 10.

In step S30 in the refusal mode, the processor 22 determines whether there are two or more lanes in a direction in which the autonomous driving vehicle 1 is currently running. More specifically, the processor 22 detects the number of lanes from an image captured by the first camera 124 in the forward direction from the main vehicle part 10.

In a case where the processor 22 determines that the number of lanes is greater than or equal to 2 (YES in step S30), the processor 22 proceeds to step S31. In step S31, the processor 22 sets, as the detection area S, an area including a left-hand side of a road in an image capture area R of the first camera 124 as in step S22.

On the other hand, in a case where the processor 22 determines that the number of lanes is neither greater than nor equal to 2, (NO in step S30), the processor 22 proceeds to step S32. In step S32, the processor 22 sets, as the detection area S, an area including a left-hand side and a right-hand side of the road in the image capture area R of the first camera 124 as in step S23.

In step S33, the processor 22 determines whether a person who is making a vehicle-stop-request gesture is detected within the detection area S. In a case where the processor 22 detects a person who is making a vehicle-stop-request gesture (YES in step S33), the processor 22 proceeds to step S34, while in a case where no person who is making a gesture for stopping a vehicle is detected (NO in step S33), the present state is maintained.

In step S34, the processor 22 controls the communication part 141 to output a vehicle dispatch request to dispatch a vehicle to a location where the potential passenger G is present. More specifically, the vehicle dispatch request includes a time at which a potential passenger G is detected, and location data indicating a location where the potential passenger G is present. When the information terminal 101 in the vehicle dispatch system 100 accepts the vehicle dispatch request via the network N, the information terminal 101 outputs, to another autonomous driving vehicle 1, a vehicle dispatch command to go to the location where the potential passenger G is present. In this process, the processor 22 may control the notifier 13 to provide a notification indicating that the vehicle dispatch request has been output. As a result, the potential passenger G is notified that the vehicle-stop-request gesture has been transferred to another autonomous driving vehicle 1.

After the vehicle dispatch request is output, the processor 22 terminates the refusal mode and controls the main vehicle part 10 to again start autonomous driving.

3. Effects and Related Issues

The autonomous driving vehicle 1 according to the present embodiment includes the main vehicle part 10, the gesture detector (the first camera 124, the memory 21, and the processor 22) that detects a gesture (a vehicle-stop-request gesture) made, to try to stop the main vehicle part 10, by a person present near a road on which the main vehicle part 10 is running, the determiner (the processor 22 and the second camera 125) that determines whether there is a passenger in the main vehicle part 10, and the controller (the automatic driving system 20) that autonomously drives the main vehicle part 10, wherein in a case where the determiner determines that there is no passenger in the main vehicle part 10, if the gesture detector detects a person making a gesture, the controller controls the main vehicle part 10 to stop near the person.

The method of stopping the autonomous driving vehicle 1 according to the present embodiment includes stopping a main vehicle part of the autonomous driving vehicle 10 such that in a case where it is determined that there is no passenger in the main vehicle part 10 of the autonomous driving vehicle 1, when a gesture (a vehicle-stop-request gesture) made, to try to stop the main vehicle part, by a person present near a road on which the main vehicle part is running, the main vehicle part is stopped near the person who made the gesture.

The program according to an embodiment causes a computer to execute the method of stopping an autonomous driving vehicle.

Thus, when it is determined that there is no passenger in the main vehicle part 10 of the autonomous driving vehicle 1, if a vehicle-stop-request gesture made in order to try to stop the main vehicle part 10 is detected, the main vehicle part 10 is stopped near the potential passenger G who made the vehicle-stop-request gesture. When there is a passenger in the main vehicle part 10, the autonomous driving vehicle 1 continues running without stopping. That is, it is assumed that it is possible to prevent the autonomous driving vehicle 1 from stopping in order to try to get a potential passenger G into the autonomous driving vehicle 1 when there is already a passenger in the autonomous driving vehicle 1. This makes it possible to efficiently get a potential passenger G into the autonomous driving vehicle 1.

The gesture detector may detect a vehicle-stop-request gesture made by a person present on either one of a left-hand side or a right-hand side of a road.

Thus, the gesture detector is capable of setting, as the detection area, one of the right-hand side and the left-hand side of the road, and thus it is possible to achieve an increase in the speed of the detection process. For example, in countries in which vehicles are supposed to run on left-hand sides of roads, in many cases, potential passengers G are present on left-hand sides of roads. Therefore, by setting the left-hand side of the road as the detection area S of the gesture detector, it is possible to achieve an increase in the speed of the detection process.

The autonomous driving vehicle 1 may include the lane detector (the processor 22 and the first camera 124) that detects the number of lanes on the road in the same running direction, and in a case where the lane detector detects that the number of lanes is 1, the gesture detector may detect a vehicle-stop-request gesture made by a person present on the right-hand side and the left-hand side of the road, while in a case where the lane detector detects that the number of lanes is 2 or greater, the gesture detector detects a vehicle-stop-request gesture made by a person present on one of the right-hand side and the left-hand side of the road.

This makes it possible to adjust the detection area S of the gesture detector depending on the number of lanes.

For example, in a case where the number of lanes in the same running direction is 1, the total width of the road is likely to be relatively small. More specifically, when a road is a one-way road or a road with one lane on each side, the number of lanes in the same running direction is detected as 1. When the road is a one-way road, the autonomous driving vehicle 1 running on a lane of this road is allowed to deal with a potential passenger G present on the right-hand side or the left-hand side of the road. When the road is a road with one lane on each side, the autonomous driving vehicle 1 is allowed to make a U-turn to deal with a potential passenger G present on a side of an opposite lane.

On the other hand, in a case where the number of lanes in the same running direction is greater than or equal to 2, the total width of the road is relatively large. Therefore, it is not desirable for the autonomous driving vehicle 1 to deal with both potential passengers G present on the right-hand side and the left-hand side of the road, because, for example, moving to the other lane may interfere with running of another vehicle.

The capability of adjusting the detection area of the gesture detector depending on the number of lanes as described above makes it possible to set the detection area properly depending on the situation.

In a case where the lane detector detects that the number of lanes is 2 or greater and furthermore the determiner determines that there is no passenger in the main vehicle part, the controller may control the main vehicle part to run on a lane L1 located closest to a sidewalk W of the two or more lanes.

In almost all cases, potential passengers G are present on a sidewalk W. Therefore, when it is determined that there is no passenger in the main vehicle part 10, the main vehicle part 10 is running on the lane L1 located closest to the sidewalk W of two or more lanes L1, L2, that is, the main vehicle part 10 is running on the lane L1 closest to locations of potential passengers G. This makes is possible to smoothly access a potential passenger G.

The gesture detector may detect a second gesture (a cancellation gesture) made by the person (the potential passenger G) to try to cancel stopping the main vehicle part 10, and in a case where after the gesture detector detects a person making a vehicle-stop-request gesture, the gesture detector further detects the cancellation gesture made by the person, the controller may control the main vehicle part 10 to continue running.

Thus, in the case where after the gesture detector detects a potential passenger G, the gesture detector further detects a cancelation gesture made by this potential passenger G, the running of the main vehicle part 10 is continued. That is, the intention of the potential passenger G is recognized, and the main vehicle part 10 is controlled to run continuously.

The autonomous driving vehicle 1 may include the notifier 13 that provides a notification toward the outside of the main vehicle part 10, and the controller may operate such that in a case where the determiner determines that there is no passenger in the main vehicle part, if the gesture detector detects a potential passenger G, the controller controls the notifier 13 to provide a notification indicating that the potential passenger G is detected.

In the embodiments described above, by way of example, the notifier 13 including the electronic bulletin board, the liquid crystal monitor, or the like is installed on the roof of the main vehicle part 10. Alternatively, a hazard lamp provided on the main vehicle part 10 may be used as the notifier. In this case, by blinking the hazard lamp, it is possible to provide a notification to a potential passenger G.

In this case, the notifier 13 provides the notification indicating that the potential passenger is detected, and thus the potential passenger G is notified that the autonomous driving vehicle 1 has caught the vehicle-stop-request gesture.

The autonomous driving vehicle 1 may include the communication part 141 that communicates with the vehicle dispatch system 100 that patches another autonomous driving vehicle 1 to a particular location, and the controller may operate such that in a case where the determiner determines that there is a passenger in the main vehicle part 10, when the gesture detector detects a person making a vehicle-stop-request gesture, the controller controls the communication part 141 to output, to the vehicle dispatch system 100, a vehicle dispatch request to a location where the person is present.

Thus, in the case where the determiner determines that there is a passenger in the main vehicle part 10, that is, in a situation in which it is not allowed to accept a potential passenger G, if the gesture detector detects a potential passenger G, the communication part 141 outputs, to the vehicle dispatch system 100, a vehicle dispatch request to a location where this potential passenger G is present. Thus, the vehicle dispatch system 100 dispatches another autonomous driving vehicle 1 to the potential passenger G.

Further Embodiments

Examples of techniques disclosed in the present description have been described above with reference to embodiments. However, the techniques according to the embodiments are not limited to the examples described above. Modifications, replacements, additions, deletions, or the like are possible. Furthermore, various parts or elements of the embodiments may be combined to obtain another embodiment.

For example, in the embodiments described above, by way of example, the second camera 125 functions as a part of the determiner that determined whether there is a passenger in the main vehicle part 10. However, a sensor other than cameras may be employed as a part of the determiner as long as it is possible to determine whether there is a passenger in the main vehicle part 10. Example of such sensors include a weight sensor, a human sensor, etc. In a case where a weight sensor is used, the weight sensor may be disposed in a seating plane of the sheet 11. Based on a result of a detection by the weight sensor, the processor 22 is capable of determining whether there is a passenger. On the other hand, in a case where a human sensor is used, the human sensor may be disposed in the main vehicle part 10 such that the space in the vehicle of the main vehicle part 10 becomes a detection area. Based on a result of a detection by the human sensor, the processor 22 is capable of determining whether there is a passenger. Examples of human sensors include a temperature sensor, an ultrasonic sensor, an infrared sensor, etc.

In the embodiments described above, by way of example, the first camera 124 functions as a part of the gesture detector that detects a gesture made by a person. Alternatively, for example, a radar unit, a lidar system, or the like may be used to detect a gesture made by a person. In this case, the radar unit or the lidar system functions as a part of the gesture detector.

In the embodiments described above, by way of example, when a potential passenger G is present on the sidewalk W2 on the side of the opposite lane, the main vehicle part 10 is controlled to make a U-turn and move to a location near the potential passenger G. However, by road traffic regulation, a U-turn is prohibited at some locations. At such locations, even when there is a potential passenger G, it is desirable not to make a U-turn.

For example, the processor 22 detects a U-turn prohibited sign from an image captured by the first camera 124 in the forward direction from the main vehicle part 10. That is, the processor 22 and the first camera 124 together function as the U-turn prohibition detector that detects whether the U-turn is prohibited on a road. In a case where the processor 22 detects that the U-turn on a road is prohibited, the processor 22 may detect a vehicle-stop-request gesture made by a person present on one of the right-hand side and the left-hand side of the road.

This makes it possible to adjust the detection area S depending on whether the U-turn is prohibited. More specifically, when the U-turn is prohibited, the autonomous driving vehicle 1 is not allowed to move to an opposite lane. That is, even when there is a potential passenger G on a side of a lane opposite to the lane on which the autonomous driving vehicle 1 is running, the autonomous driving vehicle 1 is not allowed to deal with the potential passenger G. In this case, the detection area S is set so as to include only an area on the side of the lane in which the autonomous driving vehicle 1 is running.

It is possible to detect whether a U-turn is prohibited on a road by using regulation information described in the map data stored in the memory 21 together with the GPS module 121.

In the embodiments described above, by way of example, the determination as to whether a cancellation gesture is issued or not is made before the autonomous driving vehicle 1 stops. Alternatively, the determination as to whether a cancellation gesture is issued or not may be made after the autonomous driving vehicle 1 stops. In this case, in a case where a potential passenger G does not get in the autonomous driving vehicle 1 in a period of time with a predetermined length after the autonomous driving vehicle 1 stops, it may be regarded that a cancellation gesture has been issued.

In the embodiments described above, each constituent element may be realized using dedicated hardware or may be realized by executing software program corresponding to the constituent element. Each constituent element may be realized by a program execution unit such as a CPU, a processor or the like by reading software program stored in a storage medium such a hard disk, a semiconductor memory, or the like and executing the software program. The software that realizes the autonomous driving vehicle 1 or the like according to each embodiment described above may be a program described below.

That is, the program causes a computer to execute the method of stopping an autonomous driving vehicle, the method including stopping a main vehicle part of the autonomous driving vehicle such that in a case where it is determined that there is no passenger in the main vehicle part of the autonomous driving vehicle, when a gesture is detected which is made, to try to stop the main vehicle part, by a person present near a road on which the main vehicle part is running, the main vehicle part is stopped near the person who made the gesture.

The autonomous driving vehicle 1 and the method of stopping the autonomous driving vehicle 1 according to one or more aspects of the present disclosure have been described above with reference to embodiments. However, the present disclosure is not limited to these embodiments. It will be apparent to those skilled in the art that various modifications may be applicable to the embodiments without departing from the spirit and scope of the present disclosure. Furthermore, constituent elements of different embodiments may be combined. In this case, any resultant combination also falls within the scope of the present disclosure.

The present disclosure is useful in autonomous driving vehicles usable as taxis or the like.

What is claimed is:

1. An autonomous driving vehicle comprising:
a processor; and
a memory storing a computer program, which when executed by the processor, causes the processor to perform operations, the operations including:
detecting a number of lanes on a road in a running direction of the autonomous driving vehicle;
detecting a gesture to stop the autonomous driving vehicle, which is made by a person near the road on which the autonomous driving vehicle is running;
determining whether there is a passenger in the autonomous driving vehicle; and
controlling the autonomous driving vehicle,
wherein the detecting of the gesture includes:
detecting the gesture on both of a right-hand side and a left-hand side of the road in a case where the number of lanes detected is one; and
detecting the gesture on one of the right-hand side or the left-hand side of the road in a case where the number of lanes detected is at least two, and
the controlling of the autonomous driving vehicle includes:
controlling the autonomous driving vehicle to stop near the person in a case where the processor determines that there is no passenger in the autonomous driving vehicle, and the gesture made by the person is detected.

2. The autonomous driving vehicle according to claim 1, wherein, in the controlling, in the case where the number of lanes detected is at least two and the processor further determines that there is no passenger in the autonomous driving vehicle, the autonomous driving vehicle is controlled to run on a lane located closest to a sidewalk of the at least two lanes.

3. The autonomous driving vehicle according to claim 1, wherein the operations further include:
determining whether a U-turn on the road is prohibited,
wherein the detecting of the gesture includes detecting the gesture made by the person present on one of the left-hand side or the right-hand side of the road in a case where the U-turn on the road is prohibited.

4. The autonomous driving vehicle according to claim 1, wherein
the detecting of the gesture detects a second gesture made by the person to cancel stopping the autonomous driving vehicle, and
in the controlling, in a case where, after the gesture made by the person is detected, and the second gesture made by the person is further detected, the autonomous driving vehicle is controlled to continue running.

5. The autonomous driving vehicle according to claim 1, wherein the operations further include:
providing a notification toward an outside of the autonomous driving vehicle,
wherein, in the providing of the notification, in the case where the processor determines that there is no passenger in the autonomous driving vehicle, and the gesture made by the person is detected, the notification indicates that the gesture made by the person is detected.

6. The autonomous driving vehicle according to claim 1, wherein the operations further include:
communicating with a vehicle dispatch system that dispatches another autonomous driving vehicle to a specified location,
wherein, in the communicating, in a case where the processor determines that there is the passenger in the autonomous driving vehicle, and the gesture made by the person is detected, a vehicle dispatch request is output to request a vehicle to be dispatched to a location where the person is present.

7. A method of stopping an autonomous driving vehicle, the method comprising:
detecting a number of lanes on a road in a running direction of the autonomous driving vehicle;
detecting a gesture to stop the autonomous driving vehicle, which is made by a person near the road on which the autonomous driving vehicle is running;
determining whether there is a passenger in the autonomous driving vehicle; and
controlling the autonomous driving vehicle,
wherein the detecting of the gesture includes:
detecting the gesture on both of a right-hand side and a left-hand side of the road in a case where the number of lanes detected is one; and
detecting the gesture on one of the right-hand side or the left-hand side of the road in a case where the number of lanes detected is at least two, and
the controlling of the autonomous driving vehicle includes:
controlling the autonomous driving vehicle to stop near the person in a case where the determining determines that there is no passenger in the autonomous driving vehicle, and the gesture made by the person is detected.

8. A non-transitory recording medium storing a program, which when executed, causes a computer to execute the method of stopping the autonomous driving vehicle according to claim 7.

9. An autonomous driving vehicle comprising:
a processor; and
a memory storing a computer program, which when executed by the processor, causes the processor to perform operations, the operations including:
determining whether a U-turn is prohibited on a road on which the autonomous driving vehicle is running;
detecting a gesture to stop the autonomous driving vehicle, which is made by a person near the road on which the autonomous driving vehicle is running;
determining whether there is a passenger in the autonomous driving vehicle; and
controlling the autonomous driving vehicle,
wherein the detecting of the gesture includes:
detecting the gesture on one of a left-hand side or a right-hand side of the road in a case where the processor determines that the U-turn is prohibited on the road, and
the controlling of the autonomous driving vehicle includes:
controlling the autonomous driving vehicle to stop near the person in a case where the processor determines that there is no passenger in the autonomous driving vehicle, and the gesture made by the person is detected.

10. The autonomous driving vehicle according to claim 9, wherein the detecting of the gesture further includes:
    detecting the gesture made by the person on both of the left-hand side and the right-hand side of the road in a case where the processor determines that the U-turn is not prohibited on the road.

11. The autonomous driving vehicle according to claim 9, wherein the operations further include:
    detecting a number of lanes on the road in a running direction of the autonomous driving vehicle,
    wherein, in the controlling, in a case where the number of lanes detected is at least two and the processor further determines that there is no passenger in the autonomous driving vehicle, the autonomous driving vehicle is controlled to run on a lane located closest to a sidewalk of the at least two lanes.

12. The autonomous driving vehicle according to claim 9, wherein
    the detecting of the gesture detects a second gesture made by the person to cancel stopping the autonomous driving vehicle, and
    in the controlling, in a case where, after the gesture made by the person is detected, and the second gesture made by the person is further detected, the autonomous driving vehicle is controlled to continue running.

13. The autonomous driving vehicle according to claim 9, wherein the operations further include:
    providing a notification toward an outside of the autonomous driving vehicle,
    wherein, in the providing of the notification, in the case where the processor determines that there is no passenger in the autonomous driving vehicle, and the gesture made by the person is detected, the notification indicates that the gesture made by the person is detected.

14. The autonomous driving vehicle according to claim 9, wherein the operations further include:
    communicating with a vehicle dispatch system that dispatches another autonomous driving vehicle to a specified location,
    wherein, in the communicating, in a case where the processor determines that there is the passenger in the autonomous driving vehicle, and the gesture made by the person is detected, a vehicle dispatch request is output to request a vehicle to be dispatched to a location where the person is present.

15. A method of stopping an autonomous driving vehicle, the method comprising:
    determining whether a U-turn is prohibited on a road on which the autonomous driving vehicle is running;
    detecting a gesture to stop the autonomous driving vehicle, which is made by a person near the road on which the autonomous driving vehicle is running;
    determining whether there is a passenger in the autonomous driving vehicle; and
    controlling the autonomous driving vehicle,
    wherein the detecting of the gesture includes:
        detecting the gesture on one of a left-hand side or a right-hand side of the road in a case where the U-turn is prohibited on the road, and
    the controlling of the autonomous driving vehicle includes:
        controlling the autonomous driving vehicle to stop near the person in a case where there is no passenger in the autonomous driving vehicle, and the gesture made by the person is detected.

16. A non-transitory recording medium storing a program, which when executed, causes a computer to execute the method of stopping the autonomous driving vehicle according to claim 15.

* * * * *